US012587602B2

(12) United States Patent
Sato

(10) Patent No.: US 12,587,602 B2
(45) Date of Patent: Mar. 24, 2026

(54) IMAGE FORMING APPARATUS, NON-TRANSITORY COMPUTER READABLE MEDIUM STORING IMAGE FORMING PROGRAM, AND INFORMATION PROCESSING SYSTEM

(71) Applicant: FUJIFILM Business Innovation Corp., Tokyo (JP)

(72) Inventor: Yusuke Sato, Kanagawa (JP)

(73) Assignee: FUJIFILM Business Innovation corp., Tokyo (JP)

( * ) Notice: Subject to any disclaimer, the term of this patent is extended or adjusted under 35 U.S.C. 154(b) by 480 days.

(21) Appl. No.: 18/164,619

(22) Filed: Feb. 6, 2023

(65) Prior Publication Data

US 2024/0106939 A1 Mar. 28, 2024

(30) Foreign Application Priority Data

Sep. 26, 2022 (JP) ................................. 2022-152516

(51) Int. Cl.
*H04N 1/00* (2006.01)
*G06K 15/02* (2006.01)
*H04W 48/00* (2009.01)

(52) U.S. Cl.
CPC ..... *H04N 1/00095* (2013.01); *H04N 1/00204* (2013.01); *H04N 1/00557* (2013.01);
(Continued)

(58) Field of Classification Search
None
See application file for complete search history.

(56) References Cited

U.S. PATENT DOCUMENTS 7,685,249 B2 * 3/2010 Kiwada ................... H04L 67/04
709/213
10,015,356 B2 7/2018 Hori
(Continued)

FOREIGN PATENT DOCUMENTS

JP      6264800     1/2018
JP    2019160278    9/2019

OTHER PUBLICATIONS

"Search Report of Europe Counterpart Application", issued on Sep. 12, 2023, pp. 1-8.
(Continued)

*Primary Examiner* — Haris Sabah
(74) *Attorney, Agent, or Firm* — JCIPRNET

(57) ABSTRACT

An image forming apparatus installed on an inside of a firewall includes a processor configured to transmit, to an information processing apparatus installed on an outside of the firewall, an image generated in accordance with an instruction of a user, process information indicating a content of a process on the image, and storage destination information indicating a storage destination of a process image obtained in a manner that the information processing apparatus executes the process according to the process information on the image, and perform control of causing the information processing apparatus to directly store the process image in a storage destination on the outside of the firewall in a case where the storage destination of the process image obtained from the storage destination information is the storage destination on the outside of the firewall.

16 Claims, 5 Drawing Sheets

(52) U.S. Cl.
CPC ....... *H04N 1/0097* (2013.01); *H04N 1/00973* (2013.01); *G06K 15/1896* (2013.01); *H04W 48/00* (2013.01)

(56) References Cited

U.S. PATENT DOCUMENTS

| | | | |
|---|---|---|---|
| 2011/0013215 A1* | 1/2011 | Yonezawa | G06F 3/121 |
| | | | 358/1.14 |
| 2011/0191464 A1 | 8/2011 | Okabe | |
| 2012/0069395 A1* | 3/2012 | Hiraike | G06F 3/1288 |
| | | | 358/1.15 |
| 2019/0278630 A1* | 9/2019 | Kuroyanagi | G06F 9/4881 |
| 2020/0336609 A1 | 10/2020 | Horie et al. | |

OTHER PUBLICATIONS

"Office Action of Europe Counterpart Application", issued on Dec. 16, 2024, p. 1-p. 7.
"Office Action of Europe Counterpart Application", issued on Jul. 10, 2025, pp. 1-10.

\* cited by examiner

IMAGE FORMING APPARATUS, NON-TRANSITORY COMPUTER READABLE MEDIUM STORING IMAGE FORMING PROGRAM, AND INFORMATION PROCESSING SYSTEM

CROSS-REFERENCE TO RELATED APPLICATIONS

This application is based on and claims priority under 35 USC 119 from Japanese Patent Application No. 2022-152516 filed Sep. 26, 2022.

BACKGROUND

(i) Technical Field

The present disclosure relates to an image forming apparatus, a non-transitory computer readable medium storing an image forming program, and an information processing system.

(ii) Related Art

JP6264800B discloses an information processing system including a plurality of information processing apparatuses that execute a plurality of processes defined by workflow information. The workflow information is information for defining an order of a plurality of processes and an information processing apparatus as an execution subject for each of the plurality of processes and, in which one information processing apparatus selected among the plurality of information processing apparatuses can be defined as the execution subject. Regarding the plurality of information processing apparatuses, an information processing apparatus defined as the execution subject executes each of a plurality of processes defined in the workflow information in the defined order, and one information processing apparatus selected in accordance with a predetermined determination condition executes a process having an execution subject defined to be one information processing apparatus selected among the plurality of information processing apparatuses in the workflow information. The workflow information defines a connection process between a process having an execution subject that is a first information processing apparatus and a process having an execution subject that is a second information processing apparatus. In the connection process, the first information processing apparatus transmits target data to the second information processing apparatus from the first information processing apparatus, changes the execution subject for the next process to the second information processing apparatus. After that, in a case where the connection process having a probability that the execution subject is brought back to the first information processing apparatus is included, the first information processing apparatus transitions the execution to the next connection process. In the next connection process, the first information processing apparatus receives, from the second information processing apparatus, information indicating that the execution subject is changed from the second information processing apparatus to the first information processing apparatus. In a case where the execution subject is changed to the first information processing apparatus, the target data is received from the second information processing apparatus.

SUMMARY

An image forming apparatus on an inside of a firewall may execute, on an image, a process instructed by a user in cooperation with a server on an outside of the firewall. In this case, transmission starting from the server from the server to the inside of the firewall may be prohibited by the setting of the firewall.

Thus, the server temporarily transmits a process image being the processed image to the image forming apparatus in response to the polling from the image forming apparatus, and the image forming apparatus transfers the process image to each storage destination.

However, in a case where the storage destination of the process image is on the outside of the firewall, the server transmits the process image to the image forming apparatus even though the server can directly transfer the process image to the storage destination.

Aspects of non-limiting embodiments of the present disclosure relate to an image forming apparatus, a non-transitory computer readable medium storing an image forming program, and an information processing system capable of improving storage efficiency of a process image as compared with a case where a process image processed by a server installed on an outside of a firewall is stored in each storage destination provided on the inside and the outside of the firewall, and all process images are temporarily transmitted from the server to an image forming apparatus provided on an inside of the firewall.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image forming apparatus installed on an inside of a firewall, the apparatus including a processor configured to transmit, to an information processing apparatus installed on an outside of the firewall, an image generated in accordance with an instruction of a user, process information indicating a content of a process on the image, and storage destination information indicating a storage destination of a process image obtained in a manner that the information processing apparatus executes the process according to the process information on the image, and perform control of causing the information processing apparatus to directly store the process image in a storage destination on the outside of the firewall in a case where the storage destination of the process image obtained from the storage destination information is the storage destination on the outside of the firewall.

BRIEF DESCRIPTION OF THE DRAWINGS

Exemplary embodiment(s) of the present invention will be described in detail based on the following figures, wherein.

DETAILED DESCRIPTION

Figures 1, 2:
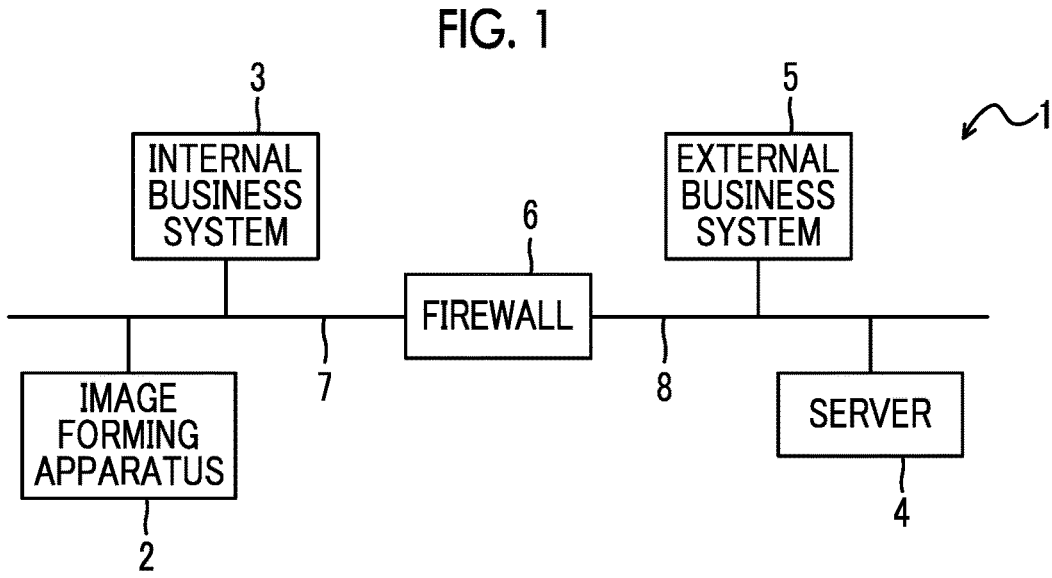
FIG. 1 is a diagram illustrating a system configuration example in an information processing system.
FIG. 2 is a sequence diagram illustrating an example of a data flow in the information processing system in a case where a storage destination of a process image is specified as an internal business system.

Hereinafter, an exemplary embodiment of the present disclosure will be described with reference to the accompanying drawings. The identical components and the identical processes are denoted by the identical reference signs in the drawings, and repetitive description will be omitted.

FIG. 1 is a diagram illustrating a system configuration example in an information processing system 1 in the present disclosure. The information processing system 1 includes an image forming apparatus 2, an internal business system 3, a server 4, an external business system 5, and a firewall 6. The image forming apparatus 2 and the internal business system 3 are connected to a communication line 7. The server 4 and the external business system 5 are connected to a communication line 8.

For easy description, a place where the image forming apparatus 2 and the internal business system 3 connected to the communication line 7 are installed with the firewall 6 as a boundary is referred to as an "inside of the firewall 6". Further, a place where the server 4 and the external business system 5 connected to the communication line 8 are installed with the firewall 6 as a boundary is referred to as an "outside of the firewall 6". The inside of the firewall 6 corresponds to, for example, the space of a company building where a user works, and the outside of the firewall 6 corresponds to, for example, a cloud space constructed on the Internet.

The image forming apparatus 2 is an apparatus that forms an image in accordance with an instruction of a user. For example, a printer, a scanner, a copying machine, a fax device, and the like are examples of the image forming apparatus 2, and an apparatus having at least two or more functions of these devices is also an example of the image forming apparatus 2. As an example, the image forming apparatus 2 in the present disclosure includes at least a function of a scanner, and description will be made on the assumption that the user forms an image obtained by optically scanning a document with a scanner.

The image forming apparatus 2 not only forms an image of a document, but also provides the user with a menu of an image process such as an optical character recognition (OCR) process of performing text recognition on an image of a document, for example. The user transmits, to the image forming apparatus 2, an instruction of an intended image process and a storage destination of an image subjected to the image process.

Since an image has a larger data capacity than, for example, text data, in a case where the instructed image process is executed by the image forming apparatus 2, a load is applied to the image forming apparatus 2, and it may take a long time to end the image process. Therefore, the image forming apparatus 2 transmits the formed image to the server 4, and causes the server 4 to execute the image process on the image.

The server 4 is an example of an information processing apparatus that executes an image process instructed by the image forming apparatus 2 by receiving an image from the image forming apparatus 2, and editing and processing the received image. Then, the server 4 specifies whether a storage destination of the image subjected to the image process is on the inside or the outside of the firewall 6, and stores the image subjected to the image process based on the specified result. The image after the instructed image process is executed is referred to as a "process image" below.

The internal business system 3 is a system provided on the inside of the firewall 6, and performs business using a process image, such as form organization. The internal business system 3 that handles the process image is an example of a storage destination of the process image.

The external business system 5 is a system provided on the outside of the firewall 6, and performs business using a process image, such as analysis of document contents. The external business system 5 that handles the process image is also an example of the storage destination of the process image.

As described above, the storage destinations of the process image in the information processing system 1 exist on the inside and the outside of the firewall 6, and are selected depending on the intended use of the process image. For example, in a case where the process image includes confidential information, it can be safer to handle the process image with the own equipment in a company of which an access from the outside is restricted by the firewall 6 than to handle the process image in a cloud. Thus, the storage destination of the process image may be designated by the internal business system 3. In the case of accumulating process images, it is often cheaper to use the cloud than to prepare equipment corresponding to the data capacity required for accumulating the process images, so the storage destination of the process image may be designated by the external business system 5.

The firewall 6 restricts the access from the outside of the firewall 6 to the inside of the firewall 6. Thus, for example, even though the server 4 specifies that the storage destination of the process image is the internal business system 3, the server 4 is not permitted to directly transfer the process image to the internal business system 3. In this case, the server 4 transmits the process image to the image forming apparatus 2 as a response to polling from the image forming apparatus 2, and requests the image forming apparatus 2 to transfer the process image to the internal business system 3.

On the other hand, the firewall 6 permits an access from the image forming apparatus 2 to the server 4.

There are no restrictions on the connection forms of the communication line 7 provided on the inside of the firewall 6 and the communication line 8 provided on the outside of the firewall 6, and the connection form may be either a wireless form or a wired form, or a mixture of a wireless form and a wired form. The communication line 7 corresponds to, for example, a local area network (LAN), and the communication line 8 corresponds to, for example, the Internet.

Next, a data flow in the information processing system 1 will be described.

FIG. 2 is a sequence diagram illustrating an example of a data flow in the information processing system 1 in a case where a storage destination of a process image is specified as the internal business system 3 by the server 4.

First, the image forming apparatus 2 receives an instruction from the user. The instruction includes process information indicating a type of an image forming function to be executed (for example, a scanning function by a scanner) and a content of an image process to be executed on an image (for example, OCR process), and storage destination information indicating a storage destination of a process image obtained by executing the image process on the image in accordance with the process information.

The image forming apparatus 2 generates a job for managing instruction contents for each instruction, and associates the generated job with a type of an image forming function to be executed, process information, and storage destination information. In a case where the image forming apparatus 2 generates an image by the instructed image forming function, the image forming apparatus 2 generates a process request including the instructed process information and the storage destination information, and transmits the process request to the server 4 together with the generated image (FIG. 2: F1).

The server 4 generates a process image obtained by executing the process designated by the process information on the transmitted image, and specifies a storage destination of the process image by using the storage destination information. Here, it is assumed that the storage destination of the process image is specified as the internal business system 3. A method of specifying the storage destination of the process image using the storage destination information will be described later.

On the other hand, after transmitting the process request to the server 4, the image forming apparatus 2 transmits a process result request for requesting the process result on the image to the server 4 in order to obtain the process result of the requested image process (FIG. 2: F2).

On the other hand, the server 4 transmits a process result notification to the image forming apparatus 2 as a response to an acquisition result request (FIG. 2: F3). The process result notification includes a process result of whether or not the image process on the requested image is normally completed. In a case where the image process on the requested image is normally completed, the server 4 adds the process image to an acquisition result notification.

In a case where the process image is added to the received acquisition result notification, the image forming apparatus 2 transfers the process image to the storage destination of the internal business system 3 represented by the storage destination information (FIG. 2: F4), and executes an end process on the instruction received from the user.

The end process includes, for example, notification of the process result to the user, recording of an execution history, and deletion of a completed job.

Figure 3:
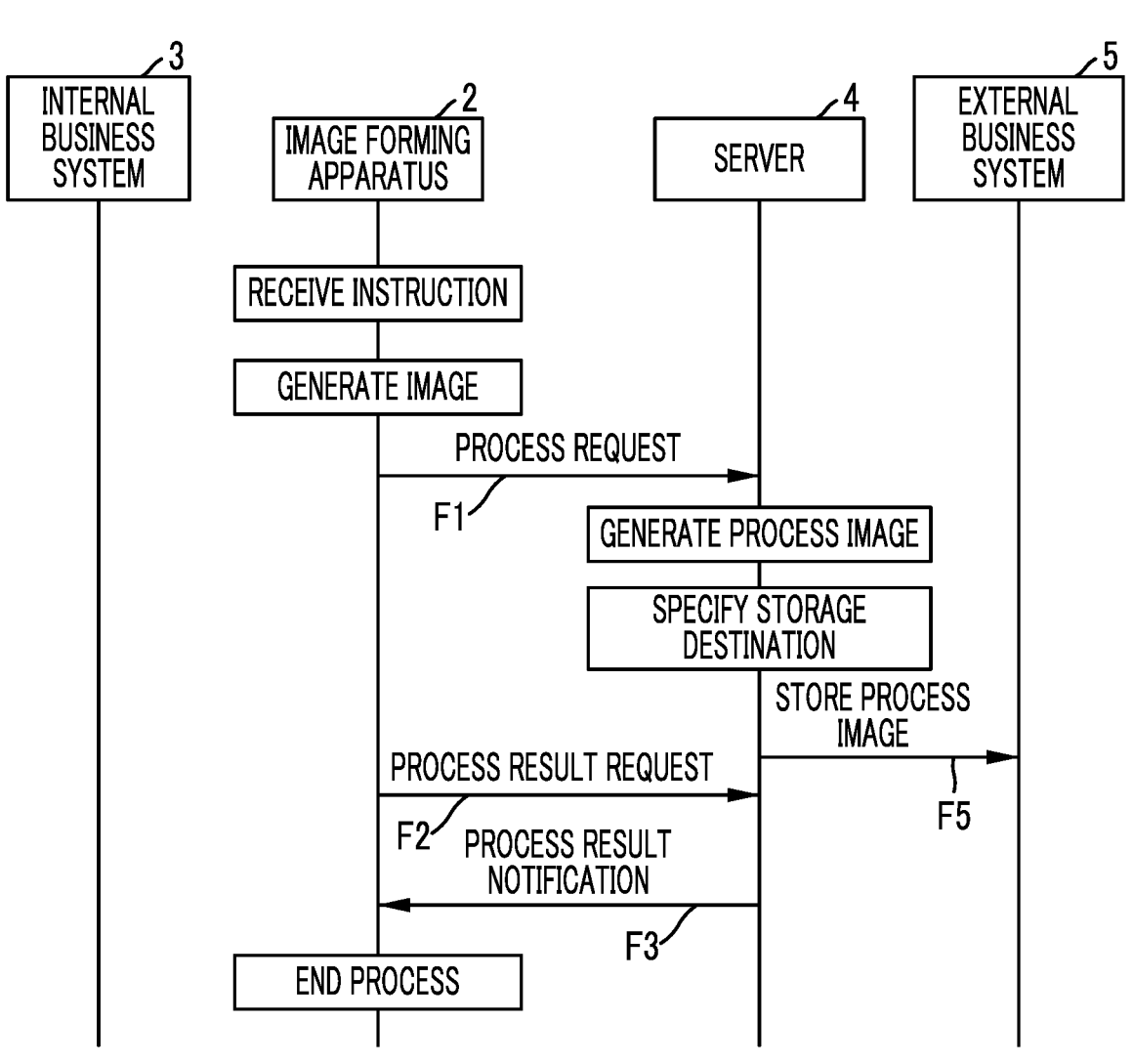
FIG. 3 is a sequence diagram illustrating an example of a data flow in the information processing system in a case where a storage destination of a process image is specified as an external business system.

FIG. 3 is a sequence diagram illustrating an example of a data flow in the information processing system 1 in a case where a storage destination of a process image is specified as the external business system 5 by the server 4. The image forming apparatus 2 transmits the process request to the server 4 (FIG. 3: F1). The process in which the server 4 specifies the storage destination of the process image by using the storage destination information is identical to the process in FIG. 2, and thus the description thereof will not be repeated.

In a case where the server 4 specifies that the storage destination of the process image is the external business system 5, the server 4 stores the process image in the storage destination of the external business system 5 represented by the storage destination information (FIG. 3: F5).

On the other hand, after transmitting the process request to the server 4, the image forming apparatus 2 transmits the process result request to the server 4 in order to obtain the process result of the requested image process (FIG. 3: F2).

On the other hand, the server 4 transmits a process result notification to the image forming apparatus 2 as a response to an acquisition result request (FIG. 3: F3). In the example illustrated in FIG. 2, in a case where the image process on the requested image is normally completed, the server 4 adds the process image to the acquisition result notification. However, since the server 4 has already stored the process image in the external business system 5, the server 4 transmits, to the image forming apparatus 2, the process result notification without adding the process image to the process result notification, regardless of whether or not the image process on the requested image is normally completed.

In a case where the acquisition result notification is received from the server 4, the image forming apparatus 2 executes the end process on the instruction received from the user because the process image is not added to the process result notification.

An example of the data flow for storing a process image in an instructed storage destination in the information processing system 1 has been described above.

Figure 4:
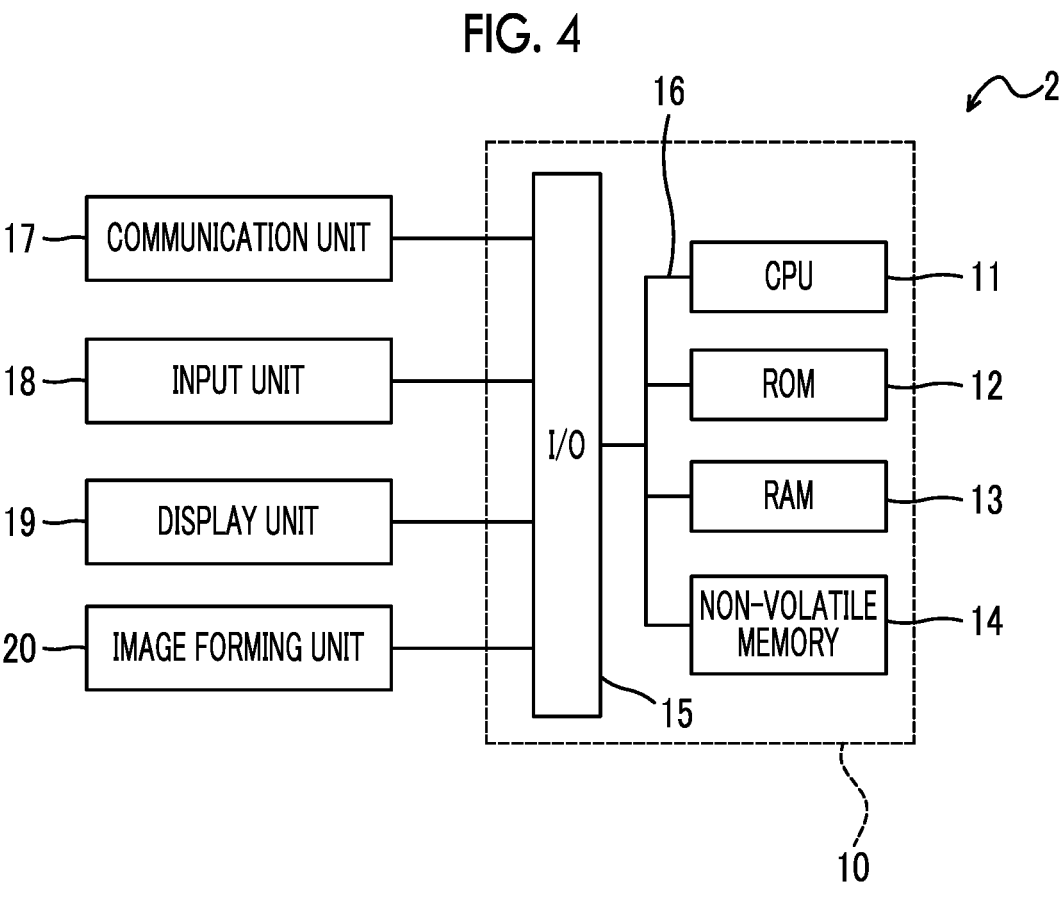
FIG. 4 is a diagram illustrating a configuration example of a main part of an electrical system of an image forming apparatus configured by using a computer.

The image forming apparatus 2 and the server 4 that execute such processes can be configured by using a computer 10 and a computer 30, respectively. FIG. 4 is a diagram illustrating a configuration example of a main part of an electrical system of the image forming apparatus 2 configured by using the computer 10.

The computer 10 includes a central processing unit (CPU) 11 which is an example of a first processor that executes a process in the image forming apparatus 2, a read only memory (ROM) 12 that stores a startup program (Basic Input Output System (BIOS)) that executes a startup process of the computer 10, a random access memory (RAM) 13 used as a temporary work area of the CPU 11, a non-volatile memory 14, and an input/output interface (I/O) 15. The CPU 11, the ROM 12, the RAM 13, the non-volatile memory 14, and the I/O 15 are connected to each other via a bus 16.

The non-volatile memory 14 is an example of a storage device that retains stored information even though power supplied to the non-volatile memory 14 is cut off. As the non-volatile memory 14, for example, a semiconductor memory is used, and a hard disk may be used.

For example, a communication unit 17, an input unit 18, a display unit 19, and an image forming unit 20 are connected to the I/O 15.

The communication unit 17 is connected to the communication line 7 and includes a communication protocol for performing data communication with the internal business system 3. Further, the communication unit 17 includes a communication protocol for performing data communication with the server 4 via the firewall 6.

The input unit 18 is an example of a unit that receives an operation of the user on the image forming apparatus 2 and notifies the CPU 11 of the operation, and includes, for example, a button, a touch panel, and a pointing device.

The display unit 19 is an example of a unit that visually displays information processed by the CPU 11, and includes, for example, a liquid crystal display and an organic electroluminescence (EL) display.

The image forming unit 20 is a unit that forms an image according to the type of the instructed image forming function. The image forming unit 20 includes, for example, a scanner unit that optically scans the contents of a document and generates an image of the document.

Figure 5:
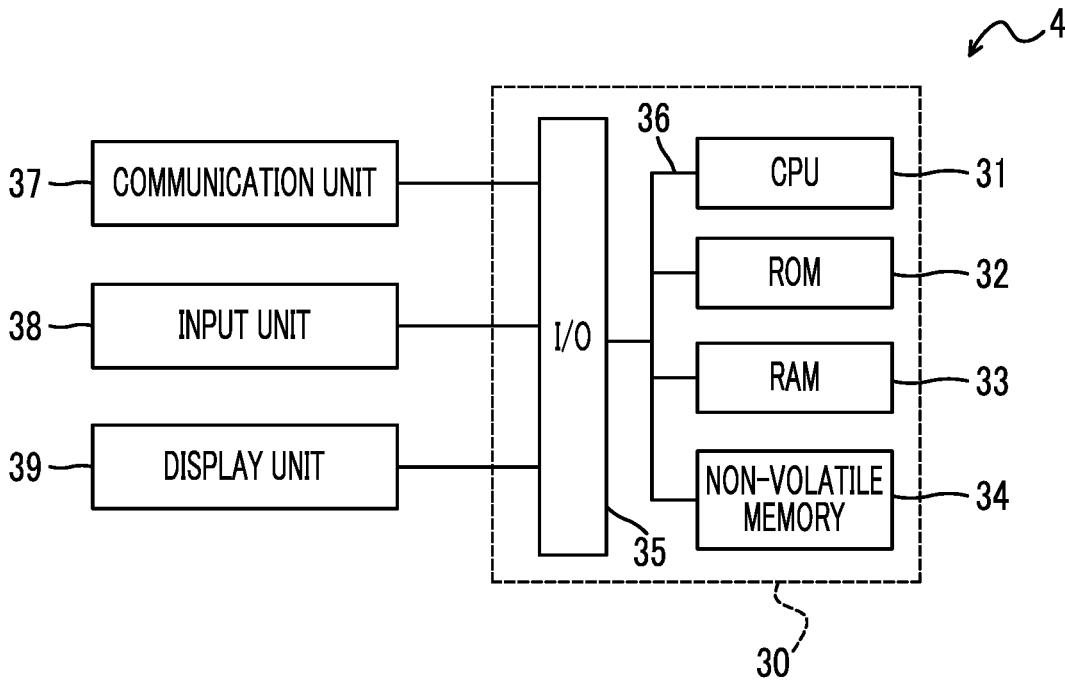
FIG. 5 is a diagram illustrating a configuration example of a main part of an electrical system of a server configured by using a computer.

On the other hand, FIG. 5 is a diagram illustrating a configuration example of a main part of an electrical system of the server 4 configured by using the computer 30.

The computer 30 includes a CPU 31 which is an example of a second processor that executes a process in the server 4, a ROM 32 that stores a BIOS of executing a startup process of the computer 30, a RAM 33 used as a temporary work area of the CPU 31, a non-volatile memory 34, and an I/O 35. The CPU 31, the ROM 32, the RAM 33, the non-volatile memory 34, and the I/O 35 are connected to each other via a bus 36.

Further, a communication unit 37, an input unit 38, and a display unit 39 are connected to the I/O 35.

The communication unit 37 is connected to the communication line 8 and includes a communication protocol for performing data communication with the external business system 5. Further, the communication unit 37 includes a communication protocol for performing data communication with the image forming apparatus 2 via the firewall 6.

The input unit 38 is an example of a unit that receives an operation of the user on the server 4 and notifies the CPU 31 of the operation, and includes, for example, a button, a touch panel, a keyboard, a mouse, and a pointing device.

The display unit 39 is an example of a unit that visually displays information processed by the CPU 31, and includes, for example, a liquid crystal display and an organic EL display.

Next, an image forming process executed by the image forming apparatus 2 will be described.

Figure 6:
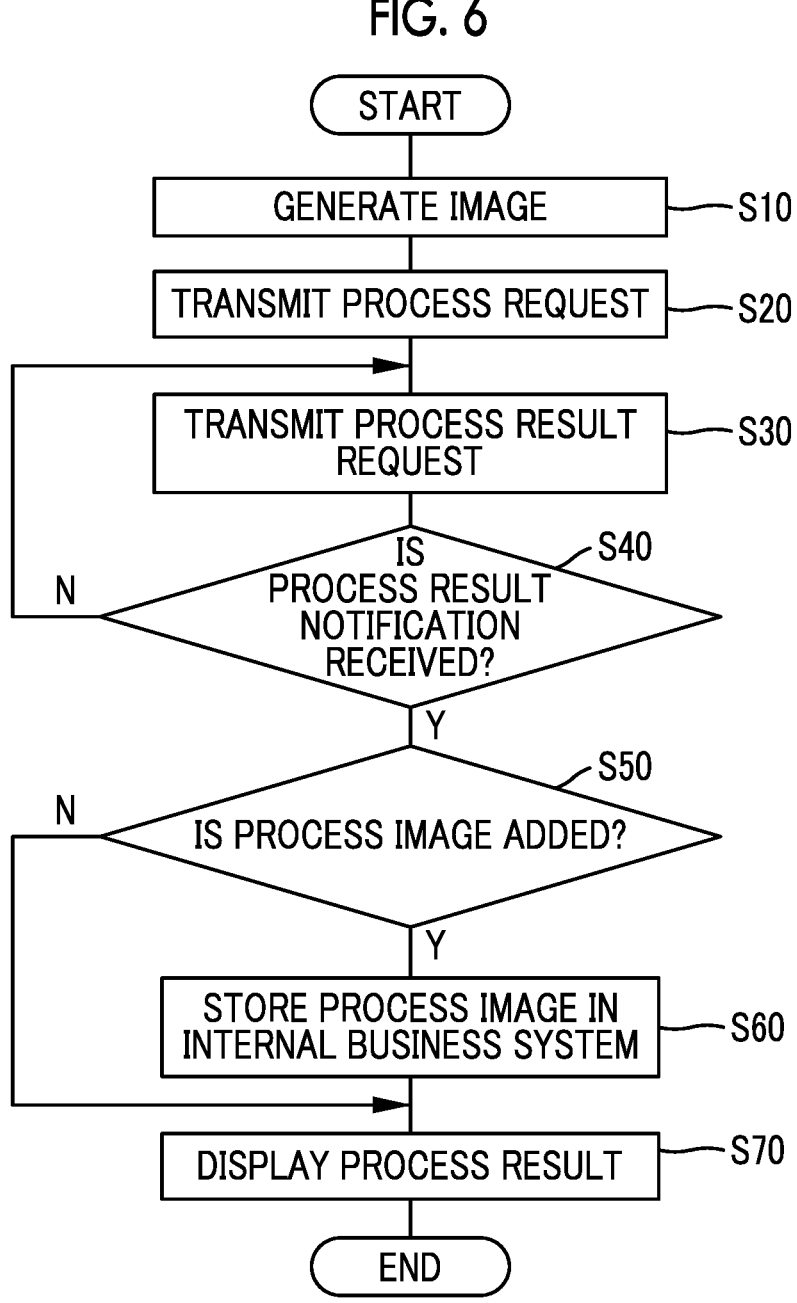
FIG. 6 is a flowchart illustrating an example of a flow of an image forming process executed by the image forming apparatus.

FIG. 6 is a flowchart illustrating an example of a flow of the image forming process executed by the CPU 11 of the image forming apparatus 2 in a case where an instruction to form an image is received from the user.

An image forming program that defines the image forming process is stored in advance in, for example, the non-volatile memory 14 of the image forming apparatus 2. The CPU 11 of the image forming apparatus 2 reads the image forming program stored in the non-volatile memory 14 and executes the image forming process.

The instruction from the user is assumed to include the type of image forming function to be executed (for example, a scanning function by a scanner), process information, and storage destination information.

First, in Step S10, the CPU 11 generates a job for managing the instruction content of the user, and generates an image by the instructed image forming function.

In Step S20, the CPU 11 generates a process request including the instructed process information and the storage destination information, and controls the communication unit 17 to transmit the generated process request to the server 4 together with the image generated in Step S10.

After transmitting the process request, in Step S30, the CPU 11 controls the communication unit 17 to transmit the process result request to the server 4.

In Step S40, the CPU 11 determines whether or not process result notification is received from the server 4 in response to the process result request transmitted in Step S30. In a case where the process result notification is not received, the process proceeds to Step S30, and the CPU 11 repeatedly transmits the process result request to the server 4 until the process result notification is received from the server 4. As described above, the reason why the process result request is repeatedly transmitted to the server 4 is that the server 4 is ready to transmit the process result notification after the image process is ended, but the image forming apparatus 2 does not know that the image process has been ended in the server 4. The CPU 11 preferably, for example, adjusts a transmission interval of the process result request and transmits the process result request to the server 4 so that the transmission interval of the process result request becomes a predetermined interval.

In a case where it is determined, in the determination process of Step S40, that the process result notification has been received from the server 4, the process proceeds to Step S50.

In Step S50, the CPU 11 determines whether or not the process image is added to the process notification result received from the server 4. In a case where the process image is added to the processed notification result, the process proceeds to Step S60. In this case, the server 4 specifies the storage destination of the process image as the internal business system 3.

Therefore, in Step S60, the CPU 11 refers to the job generated in Step S10 to store the process image added to the process notification result in the storage destination of the internal business system 3 represented by the storage destination information associated with the job. Then, the process proceeds to Step S70.

On the other hand, in a case where it is determined in the determination process of Step S50 that the process image is not added to the process notification result, since the process image is already stored in the external business system 5 by the server 4, the process proceeds to Step S70 without executing the process of Step S60.

In Step S70, the CPU 11 displays the process result notified by the process result notification on the display unit 19. Further, the CPU 11 executes an end process including recording of an execution history in the non-volatile memory 14 and deletion of the job generated in Step S10, and ends the image forming process illustrated in FIG. 6.

Figure 7:
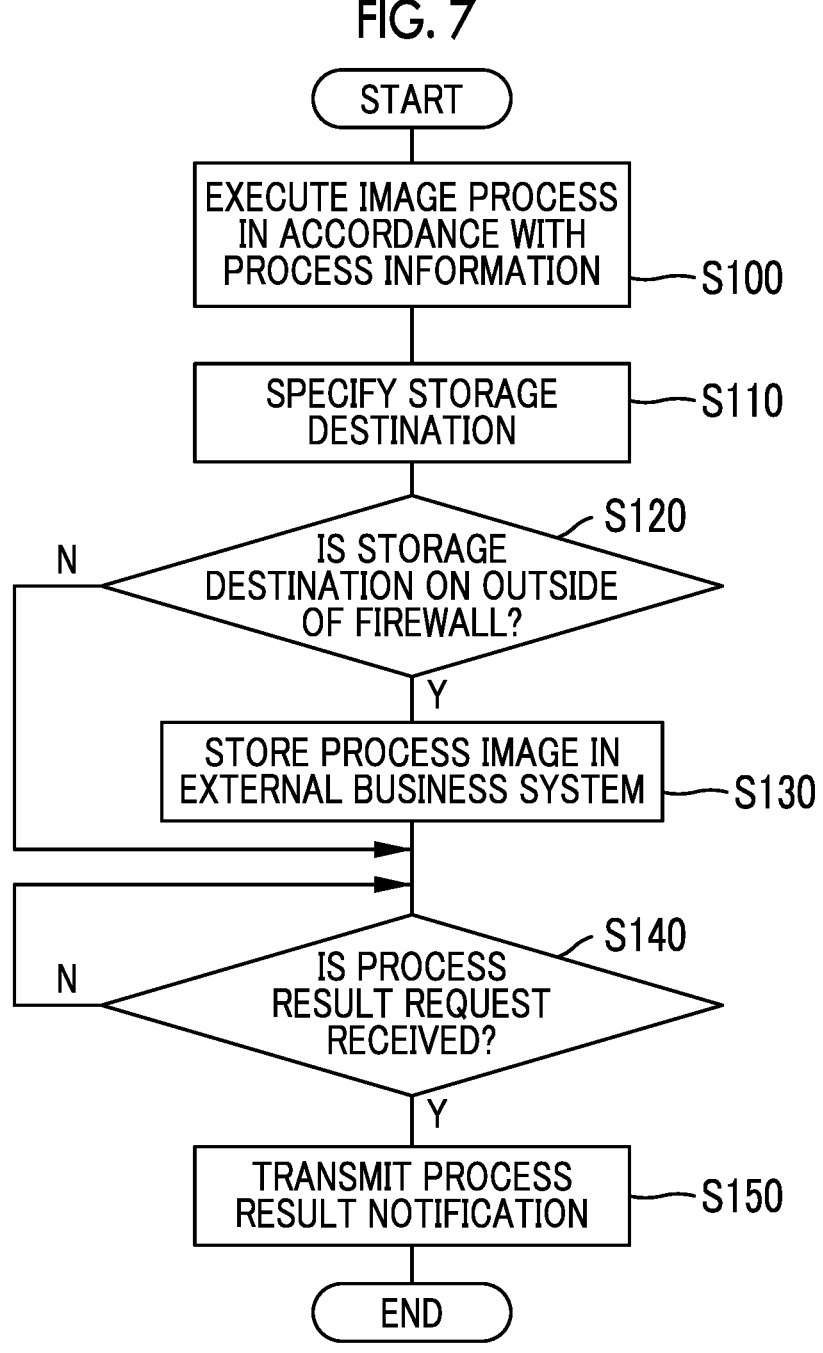
FIG. 7 is a flowchart illustrating an example of a flow of a process image storage process executed by the server.

FIG. 7 is a flowchart illustrating an example of a flow of a process image storage process executed by the CPU 31 of the server 4 in a case where the process request is received from the image forming apparatus 2.

An information processing program that defines the process image storage process is stored in advance in, for example, the non-volatile memory 34 of the server 4. The CPU 31 of the server 4 reads the information processing program stored in the non-volatile memory 34 and executes the process image storage process.

In Step S100, the CPU 31 refers to the process information included in the process request received from the image forming apparatus 2 to generate a process image obtained by executing the image process designated by the process information on the image.

In Step S110, the CPU 31 specifies a storage destination of the process image generated in Step S100 by using the storage destination information included in the process request.

The storage destination information used by the CPU 31 to specify the storage destination of the process image is, for example, information regarding a communication attribute used for transferring the process image to the storage destination. The communication attribute represents, for example, an item related to communication such as a communication protocol used for transferring a process image to a storage destination and a destination of the storage destination of the process image.

Specifically, the CPU 31 specifies the storage destination of the process image by using a communication protocol used for transferring the process image to the storage destination.

For example, in a case where the communication protocol instructed by the user is a predetermined communication protocol having a premise of being used in a closed range (for example, an in-house LAN) such as the server message block (SMB), the file transfer protocol (FTP), and the SSH file transfer protocol (SFTP), the CPU 31 specifies that the storage destination of the process image is the internal business system 3.

On the other hand, in a case where the communication protocol instructed by the user is, for example, a predetermined communication protocol having a premise of being used in the Internet such as the hypertext transfer protocol (HTTP) and the hypertext transfer protocol secure (HTTPS), the CPU 31 specifies that the storage destination of the process image is the external business system 5.

That is, the SMB, the FTP, and the SFTPS are examples of predetermined types of communication protocols used on the inside of the firewall 6, and HTTP and HTTPS are examples of predetermined types of communication protocols used on the outside of the firewall 6.

As described above, the image forming apparatus 2 sets the communication protocol used for transferring the process image to the storage destination to the predetermined type of communication protocol used on the inside of the firewall 6 in accordance with the instruction of the user, and thus causes the server 4 to recognize that the storage destination of the process image exists in the internal business system 3. Further, the image forming apparatus 2 sets the communication protocol used for transferring the process image to the storage destination to the predetermined type of communication protocol used on the outside of the firewall 6 in accordance with the instruction of the user, and thus causes the server 4 to recognize that the storage destination of the process image exists in the external business system 5.

In addition, the CPU 31 may specify whether the storage destination of the process image is on the inside or the outside of the firewall 6, by using an IP address instructed as the storage destination of the process image in addition to the communication protocol used for transferring the process image to the storage destination.

For example, for the IP address, a private IP address used in a closed range delimited by a router or the firewall 6 and a global IP address used on the Internet to which an unspecified number of devices are connected are predetermined as IP addresses.

For example, each IP address of 10.0.0.0 to 10.255.255.255, 172.16.0.0 to 172.31.255.255, and 192.168.0.0 to 192.168.255.255 is defined as a private IP address by Internet Corporation for Assigned Names and Numbers (ICANN). In addition, each IP address of 1.0.0.0 to 9.255.255.255, 11.0.0.0 to 126.255.255.255, 128.0.0.0 to 172.15.255.255, 172.32.0.0 to 191.255.255.255, 192.0.0.0 to 192.167.255.255, and 192.169.0.0 to 223.255.255.255 is defined as a global IP address by ICANN.

Therefore, in a case where the IP address instructed as the storage destination of the process image is the private IP address, the CPU 31 specifies that the storage destination of the process image is the internal business system 3. Further, in a case where the IP address instructed as the storage destination of the process image is the global IP address, the CPU 31 specifies that the storage destination of the process image is the external business system 5.

That is, by setting the IP address representing the storage destination of the process image in accordance with the instruction of the user, the image forming apparatus 2 causes the server 4 to recognize whether the storage destination of the process image exists in the internal business system 3 or the external business system 5.

Regardless of the private IP address defined by ICANN, the information processing system 1 may independently extend the range of the private IP address.

As described above, the CPU 31 may specify the storage destination of the process image from the value of the IP address. The CPU 31 may specify the storage destination of the process image by executing a ping command for the IP address, for example. The ping command is a command for checking communication with the transmission destination of the ping command. In a case where the storage destination represented by the target IP address of the ping command is a storage destination accessible from the server 4, the response is transmitted from the storage destination system. The firewall 6 exists between the internal business system 3 and the external business system 5. Thus, in a case where the storage destination represented by the IP address is the internal business system 3, the response to the ping command is not transmitted from the storage destination system. Therefore, in a case where it is not possible to receive the response to the ping command, the CPU 31 specifies that the storage destination of the process image is the internal business system 3. Further, in a case where the CPU 31 receives the response to the ping command, the CPU 31 specifies that the storage destination of the process image is the external business system 5.

Even in a case where the IP address is not set as the storage destination information, in a case where a uniform resource locator (URL) as the storage destination is set instead of the IP address, the CPU 31 may check communication with the storage destination system by executing the ping command to the URL as the storage destination.

After specifying the storage destination of the process image in this manner, in Step S120 of FIG. 7, the CPU 31 determines whether or not the storage destination of the process image is outside the firewall 6, that is, whether or not the external business system 5. In a case where the storage destination of the process image is the external business system 5, the process proceeds to Step S130.

In this case, since both the server 4 and the external business system 5 are outside the firewall 6, the CPU 31 directly stores the process image in the external business system 5 and proceeds to Step S140.

On the other hand, in a case where it is determined in the determination process of Step S120 that the storage destination of the process image is the internal business system 3, the process proceeds to Step S140 without executing the process of Step S130.

Then, the CPU 31 transmits the process result notification for notifying the process result of the image process to the image forming apparatus 2, but, as described above, transmission of data to the image forming apparatus 2 starting from the server 4 is not permitted by the firewall 6. Therefore, in Step S140, the CPU 31 determines whether or not the process result request is received from the image forming apparatus 2. In a case where the process result request is not received, the determination process of Step S140 is repeatedly executed to monitor the reception of the process result request. On the other hand, in a case where the process result request is received, the process proceeds to Step S150.

In Step S150, the CPU 31 generates a process result notification including the process result of the image process on the image, and transmits the process result notification to the image forming apparatus 2 as a response to the process result request. In this case, in a case where the CPU 31 determines, in the determination process of Step S120, that the storage destination of the process image is the internal business system 3, the CPU 31 adds the process image to the process result notification and transmits the process image to the image forming apparatus 2. Thus, as described with reference to FIG. 6, the image forming apparatus 2 stores the process image in the internal business system 3. As described above, the process image storage process illustrated in FIG. 7 is ended.

In a case where a plurality of images are added to the process request, the CPU 31 executes the image process in accordance with the process information associated with each image, and specifies the storage destination of the process image for each image by using the storage destination information associated with each image. Therefore, for example, a situation in which one process image is stored in the external business system 5 and the other process image is stored in the internal business system 3 may occur. In this case, the CPU 31 may include the process result on each image for which the image process request has been received, in the process result notification, and add the process image having the storage destination determined to be the internal business system 3 to the process result notification and transmit the process image to the image forming apparatus 2.

In the process image storage process illustrated in FIG. 7, as an example of the storage destination information, an example of specifying the storage destination of the process image by using the information regarding the communication attribute used for transferring the process image to the storage destination has been described. The storage destination information is not limited to the information regarding the communication attribute.

For example, the storage destination information may be information indicating the necessity of transmission of the process image to the image forming apparatus 2. In a case where the user designates the external business system 5 as the storage destination of the process image, the image forming apparatus 2 sets information indicating that transmission of the process image to the image forming apparatus 2 is unnecessary as the storage destination information, and transmits the process request to the server 4. Thus, the CPU 31 of the server 4 specifies that the storage destination of the process image is on the outside of the firewall 6 in Step S110 of FIG. 7. That is, each time the user causes the image forming apparatus 2 to form an image, the image forming apparatus 2 notifies the server 4 whether or not to bring the process image back to the image forming apparatus 2 in accordance with the storage destination of the process image set by the user.

In a case where the user inputs the information regarding the storage destination of the process image, the user may input the information regarding the storage destination character by character. For example, the image forming apparatus 2 may select an intended storage destination from storage destinations registered in the image forming apparatus 2 in advance, by using an address book included in the image forming apparatus 2.

As described above, in the information processing system 1, in a case where the storage destination of the process image is the internal business system 3, the image forming apparatus 2 stores the process image. In a case where the storage destination of the process image is the external business system 5, the server 4 stores the process image. However, the image forming apparatus 2 may control the server 4 to store all the process images in the storage destination designated by the user. Specifically, the manager of the image forming apparatus 2 operates the image forming apparatus 2 to transmit an instruction to forcibly transmit the process image to the image forming apparatus 2, to the server 4 in advance.

In this case, for example, even though the server 4 sets, as the storage destination information, information indicating that the image forming apparatus 2 does not need to transmit the process image to the image forming apparatus 2 in accordance with the designation of the user, the storage destination of the process image may be specified as the internal business system 3.

The manager of the server 4 may set, in advance, a determination criterion for which information of the storage destination information exemplified above is used to specify the storage destination of the process image. The server 4 specifies the storage destination of the process image in accordance with the determination criterion set in advance.

Further, after the server 4 specifies the storage destination of the process image by, for example, the communication protocol used for transferring the process image to the storage destination, the server 4 may specify the storage destination of the process image by using a plurality of determination criteria to specify the storage destination of the process image by even the IP address instructed as the storage destination of the process image.

In a case where the storage destinations obtained by all the determination criteria represent the identical storage destination, the server 4 may store the process image in the storage destination. In a case where the storage destination obtained by at least one determination criterion does not satisfy the other determination criteria, the storage destination of the process image may be specified by a majority decision.

Further, in preparation for a case where the storage destinations of the process images vary, a priority may be set in advance for each determination criterion, and the server 4 may set the storage destination obtained by the determination criterion having the highest priority, as the storage destination of the process image. In addition, the server 4 may compare an average value of priorities of the respective determination criteria in which the storage destination of the process image is determined to be the internal business system 3 and an average value of priorities of the respective determination criteria in which the storage destination of the process image is determined to be the external business system 5, and set the storage destination having the high average value, as the storage destination of the process image.

Although one aspect of the information processing system 1 has been described above using the exemplary embodiment, the disclosed form of the information processing system 1 is an example, and the form of the information processing system 1 is not limited to the scope described in the exemplary embodiment. Various changes or improvements may be made to the exemplary embodiment without departing from the gist of the present disclosure, and the changed or improved modes are also included in the technical scope of the present disclosure. For example, the internal processing order in each process such as the image forming process illustrated in FIG. 6 and the process image storage process illustrated in FIG. 7 may be changed without departing from the gist of the present disclosure.

Further, in the above-described exemplary embodiment, as an example, a mode in which each process illustrated in FIGS. 6 and 7 is realized by software has been described. However, the processes equivalent to the flowcharts may be processed by hardware. In this case, the speed of the process can be increased as compared to the case where each process is realized by software.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

In the above exemplary embodiment, an example in which the image forming program is stored in the non-volatile memory 14 and the information processing program is stored in the non-volatile memory 34 has been described. However, the storage destinations of the respective programs are not limited to the non-volatile memory 14 and the non-volatile memory 34. The image forming program according to the present disclosure can also be provided in a form of being recorded on a storage medium readable by the computer 10. The information processing program according to the present disclosure can also be provided in a form of being recorded on a storage medium readable by the computer 30. For example, the image forming program and the information processing program may be provided in a form of being recorded on an optical disc such as a compact disk read only memory (CD-ROM) and a digital versatile disk read only memory (DVD-ROM). The image forming program and the information processing program may be provided in a form in which the information processing program is recorded in a portable semiconductor memory such as a universal serial bus (USB) memory and a memory card. The ROM 12, the ROM 32, the non-volatile memory 14, the non-volatile memory 34, the CD-ROM, the DVD-ROM, the USB, and the memory card are examples of the non-transitory storage medium.

Further, the image forming apparatus 2 may download the image forming program from an external device (not illustrated) connected to the communication line 7 or the communication line 8 through the communication unit 17, and store the downloaded image forming program in a storage device. Further, the server 4 may also download the information processing program from the external device through the communication unit 37 and store the downloaded information processing program in the storage device.

In this case, the CPU 11 of the image forming apparatus 2 reads the image forming program downloaded from the external device from the storage device and executes the image forming process. Further, the CPU 31 of the server 4 reads the information processing program downloaded from the external device from the storage device and executes the storage process of the process image.

The supplementary notes according to the present exemplary embodiment are described below.

(((1)))

An image forming apparatus installed on an inside of a firewall, the apparatus comprising:
a processor configured to:
transmit, to an information processing apparatus installed on an outside of the firewall, an image generated in accordance with an instruction of a user, process information indicating a content of a process on the image, and storage destination information indicating a storage destination of a process image obtained in a manner that the information processing apparatus executes the process according to the process information on the image; and
perform control of causing the information processing apparatus to directly store the process image in a storage destination on the outside of the firewall in a case where the storage destination of the process image obtained from the storage destination information is the storage destination on the outside of the firewall.

(((2)))
The image forming apparatus according to (((1))),
wherein the storage destination information is information regarding a communication attribute used for transferring the process image to the storage destination, and
the processor is configured to:
perform control of causing the information processing apparatus to recognize whether the storage destination of the process image is on the outside or the inside of the firewall by setting the information regarding the communication attribute.

(((3)))
The image forming apparatus according to (((2))),
wherein the communication attribute is a communication protocol used for transferring the process image to the storage destination, and
the processor is configured to:
perform control of causing the information processing apparatus to recognize that the storage destination of the process image is on the outside of the firewall by setting, as the communication protocol, a predetermined type of communication protocol used on the outside of the firewall.

(((4)))
The image forming apparatus according to (((2))),
wherein the communication attribute is an IP address of the storage destination, and
the processor is configured to:
perform control of causing the information processing apparatus to recognize that the storage destination of the process image exists on the outside of the firewall by setting a predetermined type of IP address as the IP address of the storage destination of the process image.

(((5)))
The image forming apparatus according to (((2))),
wherein the communication attribute is an IP address of the storage destination, and
the processor is configured to:
perform control of causing the information processing apparatus to recognize that the storage destination of the process image is on the outside of the firewall in a case where the information processing apparatus is capable of recognizing the storage destination of the process image by using the IP address of the storage destination.

(((6)))
The image forming apparatus according to (((1))),
wherein the storage destination information is information indicating necessity of transmission of the process image to the image forming apparatus, and
the processor is configured to:
perform control of causing the information processing apparatus to recognize that the storage destination of the process image is on the outside of the firewall by setting, in the storage destination information, that the transmission of the process image to the image forming apparatus is unnecessary.

(((7)))

The image forming apparatus according to (((6))), wherein the processor is configured to:

perform control of transmitting, in advance to the information processing apparatus, an instruction to forcibly transmit the process image to the image forming apparatus, and thus causing the information processing apparatus to recognize that the storage destination of the process image is not on the outside of the firewall even in a case where it is set, in the storage destination information, that the transmission of the process image to the image forming apparatus is unnecessary.

(((8)))

The image forming apparatus according to any one of (((1))) to (((7))), wherein the processor is configured to:

in a case where the process image is received from the information processing apparatus as a response to an acquisition request of a process result on the image for the information processing apparatus, transfer the received process image to a storage destination instructed in accordance with the storage destination information, and end a process instructed by the use; and in a case where only the process result on the image is received as the response to the acquisition request, store the process result on the image in a storage device, and end the process instructed by the user.

(((9)))

A non-transitory storage medium storing a program capable of being executed by a computer installed on an inside of a firewall to execute an image forming process comprising:

transmitting, to an information processing apparatus installed on an outside of the firewall, an image generated in accordance with an instruction of a user, process information indicating a content of a process on the image, and storage destination information indicating a storage destination of a process image obtained in a manner that the information processing apparatus executes the process according to the process information on the image; and performing control of causing the information processing apparatus to directly store the process image in a storage destination on the outside of the firewall in a case where the storage destination of the process image obtained from the storage destination information is the storage destination on the outside of the firewall.

(((10)))

A non-transitory storage medium storing a program capable of being executed by a computer installed on an outside of a firewall to execute a process image storage process comprising:

generating the process image obtained by executing a process designated by process information, on an image received from an image forming apparatus;

specifying a storage destination of the process image by using storage destination information received from the image forming apparatus; and storing the process image in a specified storage destination in a case where the specified storage destination of the process image is a storage destination on the outside of the firewall, and, in a case where the specified storage destination of the process image is a storage destination on an inside of the firewall, requesting the image forming apparatus to store the process image by transmitting the process image together with a process result on the image to an image forming apparatus in response to an acquisition request of the process result on the image from the image forming apparatus.

(((11)))

An information processing system comprising:

an image forming apparatus installed on an inside of a firewall; and an information processing apparatus installed on an outside of the firewall, wherein the image forming apparatus includes a first processor configured to:

transmit, to the information processing apparatus, an image generated in accordance with an instruction of a user, process information indicating a content of a process on the image, and storage destination information indicating a storage destination of a process image obtained in a manner that the information processing apparatus executes a process according to the process information on the image, and the information processing apparatus includes a second processor configured to:

generate the process image obtained by executing a process designated by the process information on the image;

specify the storage destination of the process image by using the storage destination information;

in a case where the specified storage destination of the process image is a storage destination on the outside of the firewall, store the process image in the specified storage destination; and in a case where the specified storage destination of the process image is a storage destination on the inside of the firewall, request the image forming apparatus to store the process image by transmitting the process image together with a process result on the image to the image forming apparatus in response to an acquisition request of the process result on the image from the image forming apparatus.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus installed on an inside of a firewall, the apparatus comprising:

a processor configured to:

transmit, to an information processing apparatus installed on an outside of the firewall, an image generated in accordance with an instruction of a user, process information indicating a content of a process on the image, and storage destination information indicating a storage destination of a process image obtained in a manner that the information processing apparatus executes the process according to the process information on the image; and perform control of causing the information processing apparatus to directly store the process image in a storage destination on the outside of the firewall in a case where the storage destination of the process image obtained from the storage destination information is the storage destination on the outside of the firewall.

2. The image forming apparatus according to claim 1, wherein the storage destination information is information regarding a communication attribute used for transferring the process image to the storage destination, and the processor is configured to:

perform control of causing the information processing apparatus to recognize whether the storage destination of the process image is on the outside or the inside of the firewall by setting the information regarding the communication attribute.

3. The image forming apparatus according to claim 2, wherein the communication attribute is a communication protocol used for transferring the process image to the storage destination, and the processor is configured to:

perform control of causing the information processing apparatus to recognize that the storage destination of the process image is on the outside of the firewall by setting, as the communication protocol, a predetermined type of communication protocol used on the outside of the firewall.

4. The image forming apparatus according to claim 3, wherein the processor is configured to:

in a case where the process image is received from the information processing apparatus as a response to an acquisition request of a process result on the image for the information processing apparatus, transfer the received process image to a storage destination instructed in accordance with the storage destination information, and end a process instructed by the user; and in a case where only the process result on the image is received as the response to the acquisition request, store the process result on the image in a storage device, and end the process instructed by the user.

5. The image forming apparatus according to claim 2, wherein the communication attribute is an IP address of the storage destination, and the processor is configured to:

perform control of causing the information processing apparatus to recognize that the storage destination of the process image exists on the outside of the firewall by setting a predetermined type of IP address as the IP address of the storage destination of the process image.

6. The image forming apparatus according to claim 5, wherein the processor is configured to:

in a case where the process image is received from the information processing apparatus as a response to an acquisition request of a process result on the image for the information processing apparatus, transfer the received process image to a storage destination instructed in accordance with the storage destination information, and end a process instructed by the user; and in a case where only the process result on the image is received as the response to the acquisition request, store the process result on the image in a storage device, and end the process instructed by the user.

7. The image forming apparatus according to claim 2, wherein the communication attribute is an IP address of the storage destination, and the processor is configured to:

perform control of causing the information processing apparatus to recognize that the storage destination of the process image is on the outside of the firewall in a case where the information processing apparatus is capable of recognizing the storage destination of the process image by using the IP address of the storage destination.

8. The image forming apparatus according to claim 7, wherein the processor is configured to:

in a case where the process image is received from the information processing apparatus as a response to an acquisition request of a process result on the image for the information processing apparatus, transfer the received process image to a storage destination instructed in accordance with the storage destination information, and end a process instructed by the user; and in a case where only the process result on the image is received as the response to the acquisition request, store the process result on the image in a storage device, and end the process instructed by the user.

9. The image forming apparatus according to claim 2, wherein the processor is configured to:

in a case where the process image is received from the information processing apparatus as a response to an acquisition request of a process result on the image for the information processing apparatus, transfer the received process image to a storage destination instructed in accordance with the storage destination information, and end a process instructed by the user; and in a case where only the process result on the image is received as the response to the acquisition request, store the process result on the image in a storage device, and end the process instructed by the user.

10. The image forming apparatus according to claim 1, wherein the storage destination information is information indicating necessity of transmission of the process image to the image forming apparatus, and the processor is configured to:

perform control of causing the information processing apparatus to recognize that the storage destination of the process image is on the outside of the firewall by setting, in the storage destination information, that the transmission of the process image to the image forming apparatus is unnecessary.

11. The image forming apparatus according to claim 10, wherein the processor is configured to:

perform control of transmitting, in advance to the information processing apparatus, an instruction to forcibly transmit the process image to the image forming apparatus, and thus causing the information processing apparatus to recognize that the storage destination of the process image is not on the outside of the firewall even in a case where it is set, in the storage destination information, that the transmission of the process image to the image forming apparatus is unnecessary.

12. The image forming apparatus according to claim 11, wherein the processor is configured to:

in a case where the process image is received from the information processing apparatus as a response to an acquisition request of a process result on the image for the information processing apparatus, transfer the received process image to a storage destination instructed in accordance with the storage destination information, and end a process instructed by the user; and in a case where only the process result on the image is received as the response to the acquisition request, store the process result on the image in a storage device, and end the process instructed by the user.

13. The image forming apparatus according to claim 10, wherein the processor is configured to:

in a case where the process image is received from the information processing apparatus as a response to an acquisition request of a process result on the image for the information processing apparatus, transfer the received process image to a storage destination instructed in accordance with the storage destination information, and end a process instructed by the user; and in a case where only the process result on the image is received as the response to the acquisition request, store the process result on the image in a storage device, and end the process instructed by the user.

14. The image forming apparatus according to claim 1, wherein the processor is configured to:

in a case where the process image is received from the information processing apparatus as a response to an acquisition request of a process result on the image for the information processing apparatus, transfer the received process image to a storage destination instructed in accordance with the storage destination information, and end a process instructed by the user; and in a case where only the process result on the image is received as the response to the acquisition request, store the process result on the image in a storage device, and end the process instructed by the user.

15. A non-transitory computer readable medium storing an image forming program causing a computer installed on an inside of a firewall to execute a process comprising:

transmitting, to an information processing apparatus installed on an outside of the firewall, an image generated in accordance with an instruction of a user, process information indicating a content of a process on the image, and storage destination information indicating a storage destination of a process image obtained in a manner that the information processing apparatus executes the process according to the process information on the image; and performing control of causing the information processing apparatus to directly store the process image in a storage destination on the outside of the firewall in a case where the storage destination of the process image obtained from the storage destination information is the storage destination on the outside of the firewall.

16. An information processing system comprising:

an image forming apparatus installed on an inside of a firewall; and an information processing apparatus installed on an outside of the firewall, wherein the image forming apparatus includes a first processor configured to:

transmit, to the information processing apparatus, an image generated in accordance with an instruction of a user, process information indicating a content of a process on the image, and storage destination information indicating a storage destination of a process image obtained in a manner that the information processing apparatus executes a process according to the process information on the image, and the information processing apparatus includes a second processor configured to:

generate the process image obtained by executing a process designated by the process information on the image;

specify the storage destination of the process image by using the storage destination information;

in a case where the specified storage destination of the process image is a storage destination on the outside of the firewall, store the process image in the specified storage destination; and in a case where the specified storage destination of the process image is a storage destination on the inside of the firewall, request the image forming apparatus to store the process image by transmitting the process image together with a process result on the image to the image forming apparatus in response to an acquisition request of the process result on the image from the image forming apparatus.

* * * * *